(12) United States Patent
Meyer et al.

(10) Patent No.: US 10,967,693 B2
(45) Date of Patent: Apr. 6, 2021

(54) CHECK RAIL WITH A BALL-AND-SOCKET JOINT

(71) Applicant: Benteler Automobiltechnik GmbH, Paderborn (DE)

(72) Inventors: Stephan Meyer, Bielefeld (DE); Hauke Mehner, Paderborn (DE); Reinhard Jaeger, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 43 days.

(21) Appl. No.: 15/961,559

(22) Filed: Apr. 24, 2018

(65) Prior Publication Data

US 2018/0312024 A1    Nov. 1, 2018

(30) Foreign Application Priority Data

Apr. 26, 2017 (DE) .................... 10 2017 108 982.9

(51) Int. Cl.
*B60G 3/02*    (2006.01)
*B60G 7/00*    (2006.01)
(Continued)

(52) U.S. Cl.
CPC .......... *B60G 3/02* (2013.01); *B29C 45/14491* (2013.01); *B60G 7/001* (2013.01);
(Continued)

(58) Field of Classification Search
CPC ........ B60G 7/001; B60G 7/005; B60G 7/008; B60G 2206/81012; B60G 3/02;
(Continued)

(56) References Cited

U.S. PATENT DOCUMENTS 2,979,353 A * 4/1961 Sellers ................ F16C 11/0633
403/11
3,094,376 A * 6/1963 Thomas ............ B29C 45/14754
264/135
(Continued)

FOREIGN PATENT DOCUMENTS

CN    103201527 A    7/2013
CN    105972058 A    9/2016
(Continued)

OTHER PUBLICATIONS

Johann Martin, Device for fixing a spherical joint in a bore comprises a ball and a cage which are partly surrounded by an injected plastic material forming a ball sleeve, Apr. 7, 2005, EPO, DE 103 61 101 A1, Machine Translation of Description (Year: 2005).*

Primary Examiner — James A English
(74) Attorney, Agent, or Firm — Holland Hart LLP

(57) ABSTRACT

The present disclosure relates to a check rail for a rail suspension in a vehicle. The check rail may include a check rail body, and a ball-and-socket joint pan formed in the check rail body, wherein the ball-and-socket joint pan may include a circumferential inner wall and a receiving opening, with a ball-and-socket joint pin with an articulated ball in the ball-and-socket joint pan, and with a plastic injection layer configured to embed the articulated ball in the ball-and-socket joint pan between the circumferential inner wall of the ball-and-socket joint pan and the articulated ball.

15 Claims, 3 Drawing Sheets

(51) Int. Cl.
  *B29C 45/14* (2006.01)
  *B29L 31/30* (2006.01)
  *B29L 31/04* (2006.01)

(52) U.S. Cl.
  CPC ............. *B60G 7/005* (2013.01); *B60G 7/008* (2013.01); *B29C 45/14344* (2013.01); *B29L 2031/04* (2013.01); *B29L 2031/30* (2013.01); *B60G 2204/148* (2013.01); *B60G 2204/416* (2013.01); *B60G 2204/423* (2013.01); *B60G 2206/122* (2013.01); *B60G 2206/71* (2013.01); *B60G 2206/7104* (2013.01); *B60G 2206/81012* (2013.01)

(58) Field of Classification Search
  CPC ............... B60G 2204/416; F16C 11/06; F16C 11/0695; F16C 11/0633
  See application file for complete search history.

(56) References Cited

U.S. PATENT DOCUMENTS

| | | | | |
|---|---|---|---|---|
| 5,178,482 A | * | 1/1993 | Wood | F16C 7/02 403/130 |
| 6,152,641 A | | 11/2000 | Rabe | |
| 6,338,589 B1 | * | 1/2002 | Kincaid | B60G 21/0551 403/130 |
| 7,938,417 B2 | * | 5/2011 | Ersoy | B60G 7/001 280/124.134 |
| 2004/0265047 A1 | * | 12/2004 | Budde | F16C 33/201 403/133 |
| 2005/0111907 A1 | * | 5/2005 | Urbach | B62D 7/166 403/122 |
| 2014/0023308 A1 | * | 1/2014 | Stautner | B60G 15/068 384/615 |
| 2014/0339785 A1 | * | 11/2014 | Meyer | F16C 11/069 280/124.134 |
| 2015/0063899 A1 | * | 3/2015 | Sato | F16C 11/06 403/122 |
| 2016/0160907 A1 | | 1/2016 | Kim | |

FOREIGN PATENT DOCUMENTS

| | | |
|---|---|---|
| DE | 103 61 101 A1 | 4/2005 |
| DE | 10 2007 015 616 A1 | 10/2008 |
| DE | 10 2006 016 060 B4 | 10/2012 |
| DE | 10 2011 000 934 A1 | 12/2012 |
| EP | 2 803 512 A1 | 11/2014 |

* cited by examiner

CHECK RAIL WITH A BALL-AND-SOCKET JOINT

CROSS-REFERENCE TO RELATED APPLICATIONS

This application claims priority to German patent application No. 10 2017 108 982.9, entitled "RADLENKER MIT EINEM KUGELGELENK", and filed on Apr. 26, 2017 by the Applicant of this application. The entire disclosure of the German application is incorporated herein by reference for all purposes.

BACKGROUND

The present disclosure relates to a check rail with a ball-and-socket joint for a wheel suspension in a vehicle, in particular a transverse rail with a ball-and-socket joint for a wheel suspension in a vehicle.

Check rails such as, e.g., transverse rails or longitudinal rails are part of the suspension of a vehicle and make it possible to guide and direct the wheels fastened to the wheel suspension. Check rails therefore ensure an effective support of the wheel suspension during longitudinal forces and/or transverse forces during travel. The connection of a check rail to the wheel carrier and/or to the structural body parts is ensured by supports such as, e.g., a ball-and-socket joint.

DE 10 2011 000 934 A1 discloses a ball-and-socket joint for a chassis of a motor vehicle, wherein the ball-and-socket joint comprises a ball of a ball pivot and wherein the ball is received in a recess which is open on at least one side. The ball-and-socket joint comprises a fastening part which is connected in a firmly bonded manner to two housing halves, and/or by a pressing connection and/or by being molded with plastic.

EP 2 803 512 A1 discloses a ball-and-socket joint for structural components of a wheel suspension of a motor vehicle, wherein an articulated ball is received in a ball pan of a base body of the ball-and-socket joint. The articulated ball is held in the ball pan by a closing ring which has a flange section, wherein the flange section is connected to the base body by a welding seam running around the flange section.

SUMMARY

The present disclosure has the problem of creating an alternative check rail.

This problem is solved by the features of the independent claim. Advantageous examples of the disclosure are subject matter of the dependent claims, of the specification and of the attached drawings.

The present disclosure is based on the recognition that the above problem can be solved in that the ball-and-socket joint pan of a ball-and-socket joint is formed in the check rail body itself, and that the articulated ball of the ball-and-socket joint is injected in the ball-and-socket joint pan through a plastic injection layer. This ensures an especially simple and advantageous manufacture of a check rail with a ball-and-socket joint which makes possible an effective connection to a wheel carrier and to structural body parts of the vehicle.

According to a first aspect, the disclosure relates to a check rail for a rail suspension in a vehicle with a check rail body in which a ball-and-socket joint pan is formed, wherein the ball-and-socket joint pan has a circumferential inner wall and a receiving opening, with a ball-and-socket joint pin with an articulated ball which is introduced into the ball-and-socket joint pan, and with a layer of injected plastic which is injected for the embedding of the articulated ball in the ball-and-socket joint pan between the circumferential inner wall of the ball-and-socket joint pan and the articulated ball.

The articulated ball of the ball-and-socket joint is introduced through the receiving opening into the ball-and-socket joint pan formed on the check rail body, which ensures an advantageous seat of the articulated ball in the ball-and-socket joint pan.

During the operation of the vehicle tractive forces and pressure forces act on the check rail and on the ball-and-socket joint. In order to prevent that the articulated ball is unintentionally moved out of the ball-and-socket joint pan by the acting forces, the articulated ball is advantageously injected through the plastic injection layer in the ball-and-socket joint pan.

The plastic injection layer is injected for this between the circumferential inner wall of the ball-and-socket joint pan and the articulated ball, which ensures an effecting embedding of the articulated ball in the ball-and-socket joint pan, and at the same time advantageous degrees of rotational freedom of the articulated ball in the ball-and-socket joint pan are made possible.

As a result of the fact that the ball-and-socket joint pan is formed in the check rail body itself, an additional ball-and-socket joint housing, e.g., an additional support shell, is not necessary. This saves expenses in the manufacture of the check rail and the weight of the check wheel can be reduced in an especially advantageous manner.

In an example, the inner wall forms a circumferential, especially cylindrical or rectangular inner surface of the ball-and-socket joint pan, wherein the plastic injection layer is formed in such a manner as to compensate a difference in shape between the circumferential inner surface and a ball-shaped jacket surface of the articulated ball.

This achieves the technical advantage that differences of shapes can be compensated in the circumferential inner surface of the ball-and-socket joint pan as well as in the bowl-shaped jacket surface of the articulated ball by the plastic injection layer applied onto the inner surface of the ball-and-socket joint pan. The jacket surface of the articulated ball is ball-shaped, whereas on the other hand the circumferential inner surface of the ball-and-socket joint pan often has corners or edges and in particular is constructed in a cylindrical or rectangular manner. The inner surface of the ball-and-socket joint pan can be effectively adapted to the jacket surface of the articulated ball by the plastic injection layer applied on the inner surface of the ball-and-socket joint pan in order to make possible an advantageous, resistance-reduced rotary movement of the articulated ball in the ball-and-socket joint pan.

In one example, an inner chamber of the ball-and-socket joint pan is designed with a cylindrical or rectangular shape.

This achieves the technical advantage that the plastic injection layer between the circumferential inner wall of the cylindrical layer or rectangular shaped inner chamber of the ball-and-socket joint pan ensures an especially effective receiving of the articulated ball in the ball-and-socket joint pan.

In one example, the articulated ball is embedded in the plastic injection layer.

This achieves the technical advantage that an especially effective receiving of the articulated ball without losses in the ball-and-socket joint pan is ensured and at the same time advantageous degrees of freedom of rotational movement of the articulated ball in the ball-and-socket joint are made possible. The articulated ball is surrounded here at least in sections in particular by the plastic injection layer in order to effectively embed the articulated ball in the plastic injection layer.

In one example, the plastic injection layer is sprayed on the inner wall.

This achieves the technical advantage that an especially effective, firmly bonded connection is ensured between the plastic injection layer and the inner wall of the ball-and-socket joint pan.

In one example, the ball-and-socket joint pan has a bottom which has a central recess into which the articulated ball dips at least partially.

This achieves the technical advantage that after the introduction of the articulated ball into the ball-and-socket joint pan the plastic can be injected especially advantageously through the central recess into the inner chamber of the ball-and-socket joint pan in order to form the plastic injection layer between the circumferential inner wall of the ball-and-socket joint pan and the articulated ball.

In one example, the recess breaks through the bottom and is free of the plastic injection layer.

This achieves the technical advantage that a rotary movement of the articulated ball inside the ball-and-socket joint pan which movement is not limited by the plastic injection layer is ensured.

In one example, the bottom is shaped level or like a funnel or in the shape of a spherical shell.

This achieves the technical advantage that an advantageous geometric design of the ball-and-socket joint is ensured.

In one example, the check rail has a round plate which closes the receiving opening and secures the articulated ball in the ball-and-socket joint pan.

This achieves the technical advantage that after the introduction of the articulated ball into the ball-and-socket joint pan, the round plate advantageously secures the articulated ball inside the ball-and-socket joint pan in order to prevent that the articulated ball slides out unintentionally during the operation of the vehicle from the ball-and-socket joint pan.

In one example, the plastic injection layer is injected at least in sections onto a surface of the round plate facing the ball-and-socket joint pan, in particular facing an inner chamber of the ball-and-socket joint pan.

This achieves the technical advantage that the round plate as well as the plastic injection layer ensure an especially advantageous, loss-proof receiving of the articulated ball in the ball-and-socket joint pan. The round plate closes the receiving opening here on one side of the inner chamber of the ball-and-socket joint pan whereas the plastic is injected into the inner chamber from another side, in particular through a central recess in the bottom of the ball-and-socket joint pan. When the plastic injection layer produced during the injecting of the plastic has been injected on the surface of the round plate facing the inner chamber, the articulated ball is advantageously at least embedded in sections by the round plate and also by the plastic injection layer.

In one example, the round plate is firmly bonded to the check rail body, in particular by a welding connection or a soldering connection or by an adhesive connection.

This achieves the technical advantage that an especially effective fastening of the round plate on the check rail body can be ensured by a firmly bonded connection.

In one example, the check rail body is formed in one piece from metal, especially steel, or from an extruded profile.

This achieves the technical advantage that a check rail formed in one piece from metal or from an extruded profile has especially advantageous mechanically properties and can be efficiently manufactured.

In one example, the check rail comprises a long shank and a short shank extending from the long shank in a bent manner, wherein the long shank comprises a first long shank end and a second long shank end, and wherein the short shank comprises a short shank end, wherein the ball-and-socket joint pan is formed in the first long shank end, and wherein the second long shank end comprises a bearing receptacle for receiving a bearing, in particular an elastomer bearing.

This achieves the technical advantage that forces acting on the check rail can be received in an especially advantageous manner by the check rail by the combination of the long shank with a short shank extending in a bent manner from the long shank. The ball-and-socket joint pan of the ball-and-socket joint and formed in the first long shank end and the bearing receptacle formed in the second long shank end are arranged spaced from one another on the check rail. As a result thereof, an effective fastening of the check rail on a wheel carrier and on a structural body part of the vehicle can be ensured.

In one example, the short shank end comprises a casing-shaped bearing receptacle for receiving another rotary bearing.

This achieves the technical advantage that a total of three connection points of the check rail to a wheel carrier and to structural body parts of the vehicle by the check rail are made available by the casing-shaped bearing receptacle in the short shank end adjacent to the ball-and-socket joint pan in the first long shank end and the bearing receptacle in the second long shank end. This can make possible an especially effective receiving of occurring forces by the check rail.

In one example, the check rail is designed as a transversal rail.

This achieves the technical advantage that a transversal rail can receive forces occurring during the operation of the vehicle in an especially advantageous manner.

According to a second aspect, the disclosure relates to a method for manufacturing a check rail for a wheel suspension in a vehicle, with:

Making a check rail body available in which a ball-and-socket joint pan is formed, wherein the ball-and-socket joint pan comprises a circumferential inner wall and a receiving opening, Introducing a ball-and-socket joint pin with an articulated ball into the ball-and-socket joint pan in order to position the articulated ball in the ball-and-socket joint pan, and Injecting a plastic injection layer after the introduction of the ball-and-socket joint pin between the circumferential inner wall of the ball-and-socket joint pan and the articulated ball.

This achieves the technical advantage that the method ensures the manufacturing of an especially advantageous check rail with a ball-and-socket joint.

In one example, after the introduction of the ball-and-socket joint pin into the ball-and-socket joint pan, the receiving opening is closed with a round plate, wherein the round plate is connected in a firmly bonded manner to the check rail body, and wherein the plastic injection layer is injected after the closing of the receiving opening with a round plate.

This achieves the technical advantage that as a result of the fastening of the round plate on the check rail body and the subsequent injecting of the plastic injection layer, the articulated ball can be received without losses in the ball-and-socket joint pan and a rotary movement of the articulated ball in the ball-and-socket joint pan with a reduced resistance is ensured.

In one example, the plastic injection layer is injected through a bottom-side recess of the ball-and-socket joint pan into the ball-and-socket joint pan.

This achieves the technical advantage that the plastic injection layer can be introduced especially advantageously between the circumferential inner wall of the ball-and-socket joint pan and the articulated ball.

BRIEF DESCRIPTION OF THE DRAWINGS

Examples of the present disclosure are explained in detail with reference made to the attached drawings.

DETAILED DESCRIPTION

Figure 1:
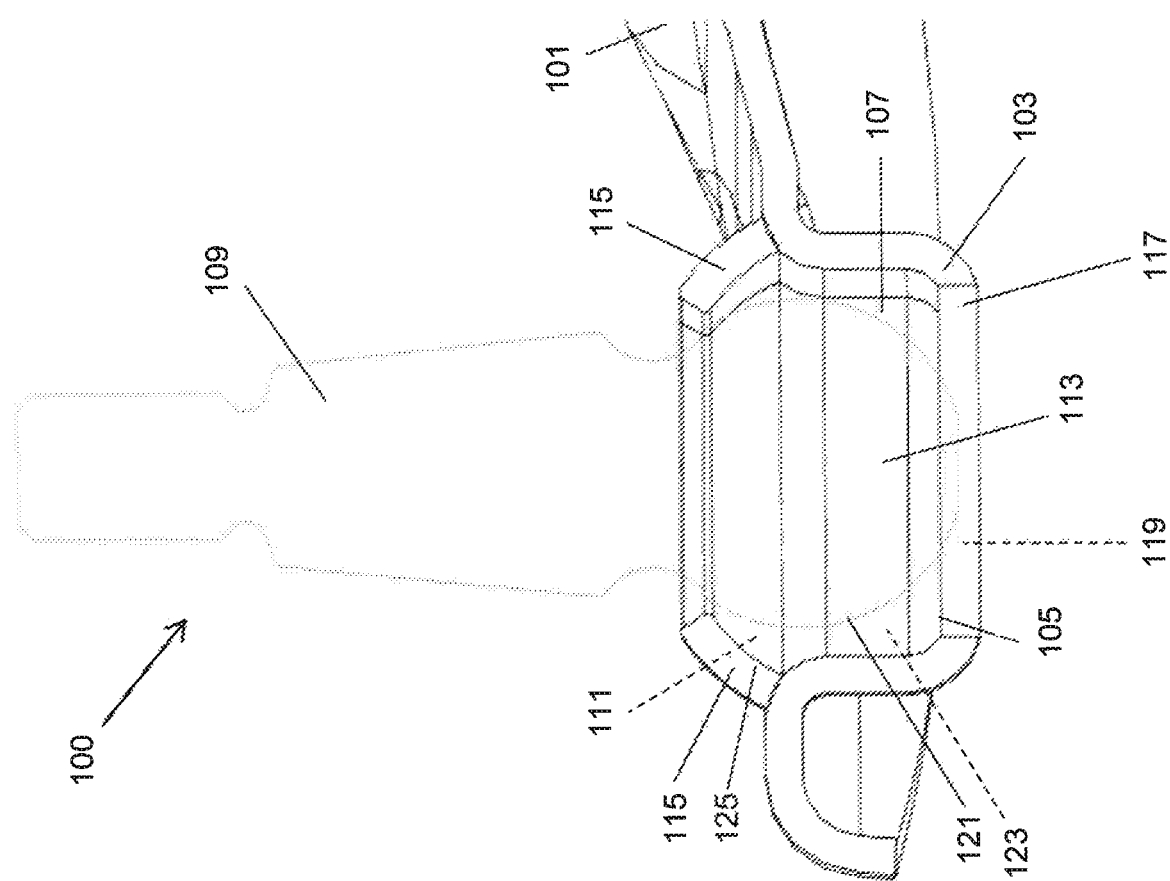
FIG. 1 shows a ball-and-socket joint of a check rail according to a first example.

FIG. 1 shows a schematic view of a ball-and-socket joint of a check rail 100 according to a first example in a sectional side view. The check rail 100, in particular a transversal rail, is set into a wheel suspension of a vehicle, wherein the wheel suspension comprises a wheel carrier for supporting a wheel of the vehicle. Therefore, the check rail 100 according to the present disclosure makes possible an effective receiving of forces which act during the travel of the vehicle on the check rail 100.

In the view shown in FIG. 1 the check rail 100 is shown only in sections.

The check rail body 101 is formed here especially in one piece from metal, especially steel, or from an extruded profile. A formed, one-piece check rail body 101 consisting of metal, in particular of steel has an especially advantageous mechanical stability. If the check rail body 101 is formed from an extruded profile, an especially advantageous manufacture of the check rail 100 is ensured.

The check rail 100 comprises a check rail body 101 in which a ball-and-socket joint pan 103 is formed, wherein the ball-and-socket joint pan 103 comprises a circumferential inner wall 105, and wherein the circumferential inner wall 105 delimits an inner chamber 107 of the ball-and-socket joint pan 103.

Der check rail 101 also comprises a receiving opening 111 through which a ball-and-socket joint pin 109 is run so that an articulated ball 113 of the ball-and-socket joint pin 109 is received in the ball-and-socket joint pan 103. In the view shown in FIG. 1 the receiving opening 111 is shown only schematically since the receiving opening 111 is closed by a round plate 115 after the introduction of the articulated ball 113.

The round plate 115 is firmly bonded to the check rail body 101, in particular by a welding connection or a soldering connection or by an adhesive connection. Die round plate 115 closes off the receiving opening 111 and secures the articulated ball 113 in the ball-and-socket joint pan 103. Therefore, the round plate 115 ensures that the articulated ball 113 does not slide out unintentionally from the ball-and-socket joint pan 103 when forces act on the check rail 100.

The ball-and-socket joint pan 103 has a bottom 117 which has a central recess 119 into which the articulated ball 113 dips at least partially. As is only schematically shown in FIG. 1, the central recess 119 breaks through the bottom 117. In the example shown in FIG. 1 the bottom 117 is formed to be level, wherein the bottom 117 can nevertheless be alternatively shaped like a funnel or like a spherical shell.

After the articulated ball 113 has been received in the ball-and-socket joint pan 103 and the receiving opening 111 has been closed off by the round plate 115, plastic is injected from underneath the check rail body 101 through the central recess 119 of the bottom 117 into the inner chamber 107 of the ball-and-socket joint pan 103.

As a consequence, a plastic injection layer 123 develops between the inner wall 105 of the ball-and-socket joint pan 103 and a jacket surface 121 of the articulated ball 113. The plastic injection layer 123 formed in the inner space 107 of the ball-and-socket joint pan 103 is only schematically shown in the view selected in FIG. 1.

The articulated ball 113 is effectively embedded in the ball-and-socket joint pan 103 by the plastic injection layer 123 formed between the inner wall 105 of the ball-and-socket joint pan 103 and the jacket surface 121 of the articulated ball 113. This ensures a loss-proof receiving of the articulated ball 113 in the ball-and-socket joint pan 103 and the rotary movement of the articulated ball 113 in the ball-and-socket joint pan 103 is made possible with a low resistance.

Since the inner wall 105 shown in FIG. 1 can have corners and edges and in particular forms a cylindrical or rectangular inner surface of the ball-and-socket joint pan 103, the plastic injection layer 123 compensates a difference in shape between the circumferential inner surface of the ball-and-socket joint pan 103 and the ball-shaped jacket surface 121 of the articulated ball 113

Die plastic injection layer 123 is sprayed to this end on the inner wall 105 so that the articulated ball 113 is embedded in an especially effective manner in the plastic injection layer 123.

In addition, the plastic injection layer 123 can be sprayed at least partially on its surface 125 of the round plate 115 which surface faces the inner chamber 107 of the ball-and-socket joint pan 103. This can bring about an especially effective fastening of the round plate 115 on the check rail body 101.

As a result of the fact that the ball-and-socket joint pan 103 is formed in the check rail body 101, no additional housing or an additional bearing shell for receiving the articulated ball 113 is necessary, as a result of which the weight of the check rail 100 can be reduced and in addition the manufacturing costs of the check rail 100 can be lowered.

The articulated ball 113 can be effectively received in the ball-and-socket joint pan 103 and the articulated ball 113 can be secured by the round plate 115 in a loss-proof manner in the ball-and-socket joint pan 103. The articulated ball 113 is especially effectively embedded in the ball-and-socket joint pan 103 by the plastic injection layer 123 injected between the inner wall 105 of the ball-and-socket joint pan 103 and the jacket surface 121 of the articulated ball 113 and can carry out rotary movements inside the ball-and-socket joint pan 103 with a reduced resistance.

Figure 2:
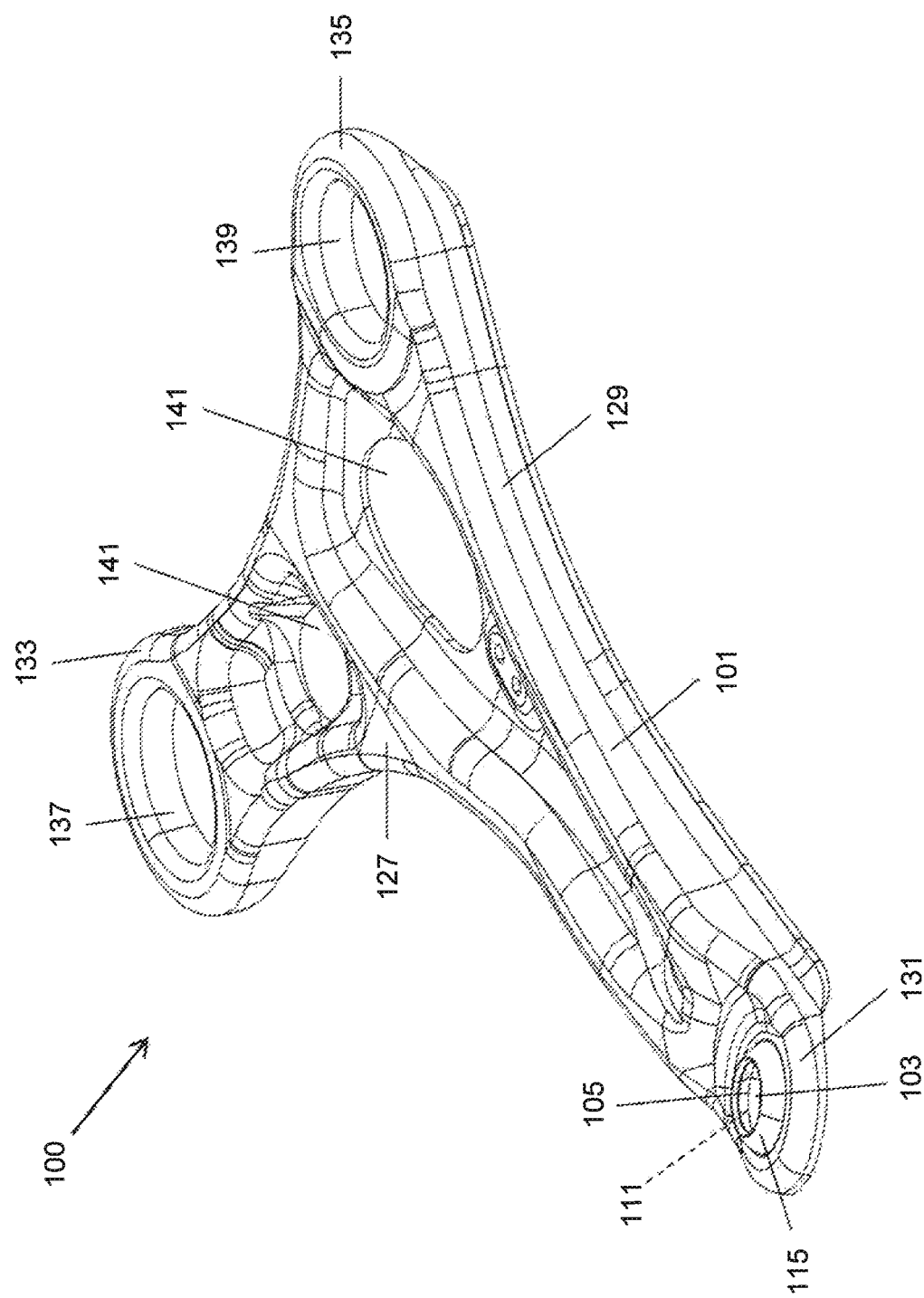
FIG. 2 shows a check rail with a ball-and-socket joint according to a second example.

FIG. 2 shows a check rail 100 with a ball-and-socket joint according to a second embodiment.

The check rail body 101 of the check rail 100 comprises a long shank 127 and a short shank 129 extending in a bent manner from the long shank 127. The long shank 127 comprises a first long shank end 131 and a second long shank end 133. The short shank 129 comprises a short shank end 135.

A ball-and-socket joint pan 103 of a ball-and-socket joint is formed in the first long shank end 131. In the view shown in FIG. 2 according to the second example an articulated ball 113 of a ball-and-socket joint pin 109, which articulated ball is introduced into the ball-and-socket joint pan 103, is not shown. Refer for this to the schematic view of a ball-and-socket joint pin 109 according to the first example in FIG. 1.

A round plate 115 is arranged on the first long shank end 131, which plate is connected in a firmly bonded manner to the check rail body 101, in particular by a welding connection, e.g., a laser welding connection MAG welding connection, friction welding connection or a soldered connection or by an adhesive connection. When the ball-and-socket joint pin 109, not shown in FIG. 2, has been introduced through a receiving opening 111 into the ball-and-socket joint pan 103, the round plate 115 closes off the receiving opening 111 and secures the articulated ball 13, which is not shown in FIG. 2, in the ball-and-socket joint pan 103.

After the round plate 115 has been fastened onto the check rail body 101, a plastic injection layer 123 not shown in FIG. 2 is injected between a circumferential inner wall 105 of the ball-and-socket joint pan 103 and a jacket surface 121 of the articulated ball 113, which surface is not shown in FIG. 2. A difference in shape between the inner wall 105 of the ball-and-socket joint pan 103 and the articulated ball 113 can be compensated by the plastic injection layer 123. In this manner the articulated ball 113 is effectively embedded in the ball-and-socket joint pan 103.

An especially effective fastening of the check rail 100 can be ensured by the ball-and-socket joint arranged on the first longitudinal shank end 131.

The second longitudinal shank and 133 of the longitudinal shank 127 comprises a bearing receptacle 137 for receiving a bearing, in particular an elastomeric bearing.

The short shank end 135 of the short shank 129 comprises a casing-shaped bearing receptacle 139 for receiving another rotary bearing.

Furthermore, several more perforations 141 are formed in the check rail body 101.

Therefore, the check rail 100 has three ends 129, 131, 133 for each receiving a different bearing so that the check rail 100 can be advantageously fastened to a wheel suspension, in particular to a wheel carrier of a vehicle and to one or more structural body parts of the vehicle.

As a consequence, forces acting on the check rail 100 can be especially advantageously received by the check rail 100.

Figure 3:
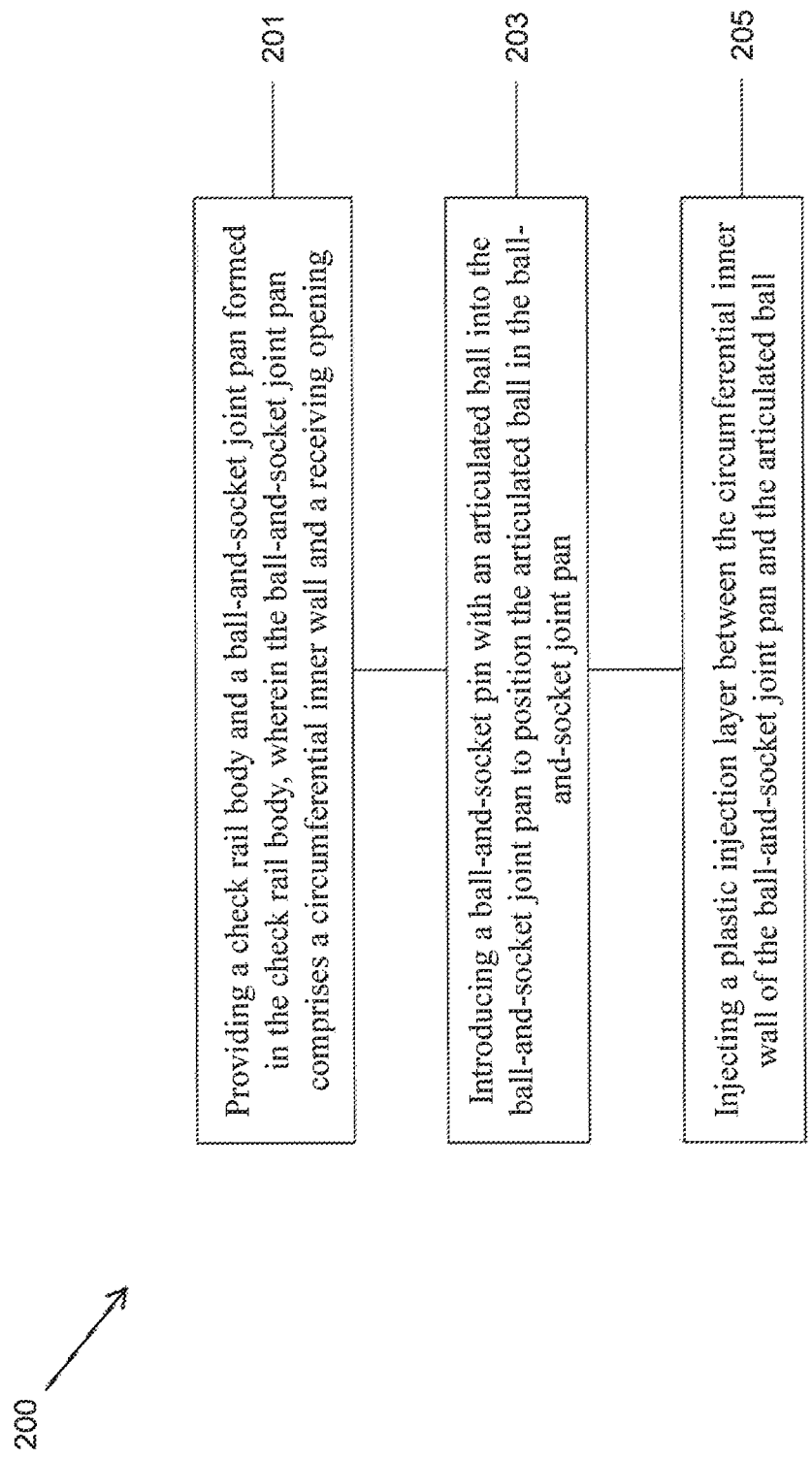
FIG. 3 shows a schematic view of a method for producing a check rail for a wheel suspension of a vehicle.

FIG. 3 shows a schematic view of a method 200 for producing a check rail 100 for a wheel suspension.

The method 200 comprises as the first step the making available 201 of a check rail body 101 in which a ball-and-socket joint pan 103 is formed, wherein the ball-and-socket joint pan 103 has a circumferential inner wall 105 and a receiving opening 111.

The method 200 comprises as the second step the introduction 203 of a ball-and-socket pin 109 with an articulated ball 113 into the ball-and-socket joint pan 103 in order to position the articulated ball 113 in the ball-and-socket joint pan 103.

The method 200 comprises as the third step the injecting 205 of a plastic injection layer 123, after the introduction of the ball-and-socket joint pan 109, between the circumferential inner wall 105 of the ball-and-socket joint pan 103 and the articulated ball 113.

Here, after the introduction 203 of the ball-and-socket joint pin 109 into the ball-and-socket joint pan 103, the receiving opening 111 is closed with a round plate 115, wherein the round plate 115 is connected in a firmly bonded manner to the check rail body 101, and wherein the plastic injection layer 123 is injected after the closing of the receiving opening 111 with a round plate 115.

An especially effective manufacture of the check rail 100 can be ensured by the method 200. The plastic can be injected in particular through a central recess 119 of a bottom 117 of the ball-and-socket joint pan 103 into an inner chamber 107 of the ball-and-socket joint pan 103. After the plastic has hardened, the plastic injection layer 123 is maintained between the circumferential inner wall 105 of the ball-and-socket joint pan 103 and the articulated ball 113 in order to form the ball-and-socket joint.

LIST OF REFERENCE NUMBERS 100 check rail
101 check rail body
103 ball-and-socket joint pan
105 inner wall
107 inner chamber
109 ball-and-socket joint pin
111 receiving opening
113 articulated ball
115 round plate
117 bottom
119 central recess
121 jacket surface of the articulated ball
123 plastic injection layer
125 surface der round plate
127 long shank
129 short shank
131 first longitudinal shank end
133 second longitudinal shank end
135 short shank end
137 bearing receptacle
139 casing-shaped bearing receptacle
141 perforation
200 method for manufacturing a check rail
201 first method step: Making a check rail body available
203 second method step: Introduction of a ball-and-socket joint pin
205 third method step: Injection of a plastic injection layer

What is claimed is:

1. A check rail for a wheel suspension in a vehicle, comprising:
   a check rail body;
   a ball-and-socket joint pan formed in the check rail body, wherein the ball-and-socket joint pan comprises a circumferential inner wall and a receiving opening;
   a ball-and-socket joint pin with an articulated ball in the ball-and-socket joint pan;
   a sprayed plastic injection layer on the circumferential inner wall that is configured to embed the articulated ball in the ball-and-socket joint pan between the circumferential inner wall of the ball-and-socket joint pan and the articulated ball; and
   a round plate that closes off the receiving opening and secures the articulated ball in the ball-and-socket joint pan,
   wherein the sprayed plastic injection layer is at least on sections of a surface of the round plate, and wherein the surface faces an inner chamber of the ball-and-socket joint pan;

wherein a central recess breaks through a bottom of the ball-and-socket joint pan and has no plastic injection layer, and the articulated ball dips at least partially into the central recess.

2. The check rail according to claim 1, wherein the inner wall forms a circumferential inner surface of the ball-and-socket joint pan, and wherein the sprayed plastic injection layer is configured to compensate a difference in shape between the circumferential inner surface and a ball-shaped jacket surface of the articulated ball.

3. The check rail according to claim 2, wherein the circumferential inner surface is a cylindrical or a rectangular inner surface of the ball-and-socket joint pan.

4. The check rail according to claim 1, wherein an inner chamber of the ball-and-socket joint pan is shaped to be cylindrical or rectangular.

5. The check rail according to claim 1, wherein the articulated ball is embedded in the sprayed plastic injection layer.

6. The check rail according to claim 1, wherein the bottom of the ball-and-socket joint pan is level, or funnel-shaped, or shaped like a spherical shell.

7. The check rail according to claim 1, wherein the round plate is firmly bonded to the check rail body.

8. The check rail according to claim 7, wherein the round plate is firmly bonded to the check rail body by a welding connection, a soldering connection, or by an adhesive connection.

9. The check rail according to claim 1, wherein the check rail body is formed in one piece from steel or from an extruded profile.

10. The check rail according to claim 1, wherein the check rail body further comprises:
a long shank and a short shank extending from the long shank in a bent manner, wherein the long shank comprises a first long shank end and a second long shank end, wherein the short shank comprises a short shank end, wherein the ball-and-socket joint pan is formed in the first long shank end, and wherein the second long shank end comprises a bearing receptacle configured to receive a bearing.

11. The check rail according to claim 10, wherein the short shank end comprises a casing-shaped bearing receptacle configured to receive a rotary bearing.

12. The check rail according to claim 1, wherein the check rail is a transversal rail.

13. A method for manufacturing a check rail for a wheel suspension in a vehicle, comprising:
providing a check rail body and a ball-and-socket joint pan formed in the check rail body, wherein the ball-and-socket joint pan comprises a circumferential inner wall and a receiving opening;
introducing a ball-and-socket pin with an articulated ball into the ball-and-socket joint pan to position the articulated ball in the ball-and-socket joint pan; and
injecting a plastic injection layer between the circumferential inner wall of the ball-and-socket joint pan and the articulated ball, wherein injecting the plastic injection layer comprises spraying the plastic injection layer onto the circumferential inner wall of the ball-and-socket joint pan;
wherein the articulated ball dips at least partially into a central recess breaking through a bottom of the ball-and-socket joint pan, and the plastic injection layer is injected such that the central recess has no plastic injection layer.

14. The method according to claim 13, further comprising:
closing the receiving opening with a round plate, wherein the round plate is connected in a firmly bonded manner to the check rail body, and wherein the plastic injection layer is injected after the closing of the receiving opening with the round plate.

15. The method according to claim 13, wherein the plastic injection layer is injected through a bottom-side recess of the ball-and-socket joint pan.

\* \* \* \* \*